US012806466B2

(12) United States Patent
Han

(10) Patent No.: US 12,806,466 B2
(45) Date of Patent: Nov. 24, 2026

(54) OMNIDIRECTIONAL TREADMILL FOR VIRTUAL REALITY AND METHOD FOR DRIVING SAME

(71) Applicant: Minwoo Han, Ansan-si (KR)

(72) Inventor: Minwoo Han, Ansan-si (KR)

( * ) Notice: Subject to any disclaimer, the term of this patent is extended or adjusted under 35 U.S.C. 154(b) by 23 days.

(21) Appl. No.: 18/857,088

(22) PCT Filed: Apr. 16, 2023

(86) PCT No.: PCT/KR2023/005140

§ 371 (c)(1), (2) Date: Oct. 15, 2024

(87) PCT Pub. No.: WO2023/204540

PCT Pub. Date: Oct. 26, 2023

(65) Prior Publication Data

US 2025/0256152 A1 Aug. 14, 2025

(30) Foreign Application Priority Data

Apr. 17, 2022 (KR) ........................ 10-2022-0047240

(51) Int. Cl.

| | |
|---|---|
| ***A63B 22/02*** | (2006.01) |
| ***A63B 24/00*** | (2006.01) |
| ***G06F 3/01*** | (2006.01) |

(52) U.S. Cl.

CPC ........ *A63B 22/0285* (2013.01); *A63B 22/025* (2015.10); *A63B 22/0257* (2013.01); *A63B 24/0062* (2013.01); *G06F 3/011* (2013.01); *A63B 2022/0271* (2013.01); *A63B 2024/0093* (2013.01); *A63B 2209/08* (2013.01); *A63B 2220/807* (2013.01)

(58) Field of Classification Search

CPC . A63B 22/02; A63B 22/0235; A63B 22/0285; A63B 22/025; A63B 22/0257; A63B 24/0062

See application file for complete search history.

(56) References Cited

U.S. PATENT DOCUMENTS 6,135,928 A * 10/2000 Butterfield .............. G06F 3/011 482/69

6,563,489 B1 * 5/2003 Latypov .................. A63F 13/90 345/164

(Continued)

FOREIGN PATENT DOCUMENTS

| | | | |
|---|---|---|---|
| JP | 2001187624 | A | 7/2001 |
| JP | 2012524581 | A | 10/2012 |
| KR | 20210023190 | A | 3/2021 |

*Primary Examiner* — Zachary T Moore

(74) *Attorney, Agent, or Firm* — The Roy Gross Law Firm, LLC; Roy D. Gross

(57) ABSTRACT

The present invention relates to an omnidirectional treadmill for virtual reality, comprising a hemispherical footplate portion frame, a footplate portion configured to be able to rotate omnidirectionally while surrounding the footplate portion frame, a covering, and a retainer. Provided that a virtual reality user needs to move at various rates of movement and in various directions, user movements in reality are counterbalanced by movements of the floor surface such that the user remains at the original location. Accordingly, the user can freely move in the virtual reality while moving at the original location in reality.

6 Claims, 5 Drawing Sheets

(56) References Cited

U.S. PATENT DOCUMENTS

| | | | |
|---|---|---|---|
| 10,114,460 | B2 * | 10/2018 | Delaney .................. G06F 3/016 |
| 11,383,062 | B2 * | 7/2022 | Brodsky ............... A61M 21/00 |
| 11,865,407 | B1 * | 1/2024 | Berme ................... G16H 20/30 |
| 12,161,477 | B1 * | 12/2024 | Berme ................. A61B 5/4023 |
| 2009/0111670 | A1 * | 4/2009 | Williams ........... A63B 23/0464<br>482/146 |
| 2013/0132910 | A1 | 5/2013 | Belmon |
| 2017/0252642 | A1 | 9/2017 | Matina |
| 2019/0307982 | A1 * | 10/2019 | Brodsky ............... A61M 21/00 |
| 2020/0222750 | A1 | 7/2020 | Salicio Castillo et al. |

* cited by examiner

OMNIDIRECTIONAL TREADMILL FOR VIRTUAL REALITY AND METHOD FOR DRIVING SAME

This application is a National Phase of PCT Patent Application No. PCT/KR2023/005140 having International filing date of Apr. 16, 2023, which claims the benefit of priority of Korean Patent Application No. 10-2022-0047240, filed Apr. 17, 2022, the contents of which are all incorporated herein by reference in their entirety.

TECHNICAL FIELD

The present invention relates to an omnidirectional treadmill for virtual reality and a method for driving the same, and more particularly, to a motor-driven omnidirectional treadmill, when a user moves at various moving speeds and in various directions in virtual reality, the user movements in reality are counterbalanced by movements of the floor surface to allow the user to remain at the original location, such that the user is allowed to freely move in the vast world of virtual reality while moving at the original location in reality.

BACKGROUND ART

In general, a treadmill refers to a device for rotating a footplate equipped with a wide belt by using a motor to enable a user to walk or run thereon. The treadmill is often used for walking or running exercise in a narrow space such as a gym or home. Recently, treadmills are being produced in an electric type, a non-electric type and the like. The movement of a floor surface counterbalances a walking or running motion of the user in the straight linear direction, thereby enabling the user to work out at a desired speed in place.

In addition, as the virtual reality technology advances recently, various devices, such as 'Oculus Quest' and 'PlayStation VR', worn on a head and allowing the user to look into a virtual reality world have been released. However, since a similar range of motion is required to be ensured in reality to explore a space in virtual reality, and the above physical constraints limit the expression of the vast virtual reality world, a device, such as the above-mentioned treadmill, for allowing in-situ exercise is required. However, the above-mentioned general treadmill is configured to allow only the straight linear motion, and accordingly, has a problem when used as a treadmill for virtual reality that requires movement in all directions, including forward, backward, left, and right.

In order to solve the above problems, several solutions have been proposed. The most advanced omnidirectional treadmills for virtual reality are available as some kinds of products in a market nowadays and include the Virtuix Omni. These products are designed to have a floor formed in a slightly concave shape while minimizing friction as possible, and allow the user's soles to slide on the floor by fixing the user's torso at the waist section, and configured to operate based on the principle in that movements of wheels or position shifts of sensors mounted on dedicated shoes are recognized to reflect the movements in reality into virtual reality.

However, since the conventional omnidirectional treadmill operates to allow the user to slide on the floor, the user feels differently compared to walking in reality while pushing off the floor. In addition, a harness-similar support structure is required to keep the user in place without slipping or falling, thereby causing much restrictions on the user's motions, such as sitting or jumping.

DISCLOSURE

Technical Problem

Thus, one main object of the present invention is to enable a user to motion in place from an origin position regardless of a moving speed or direction by counterbalancing a travel distance by rotating a treadmill floor in opposite directions to the user's 360-degree omnidirectional movement.

In addition, another object of the present invention is to use a lubricant to separate a hemispherical frame from a surface footplate surrounding the hemispherical frame so as to reduce friction between the hemispherical frame and the surface footplate, and is to allow the lubricant to be uniformly distributed along the hemispherical shape. In addition, still another object of the present invention is to apply the operating principle of a linear motor as a main power source to avoid complex mechanical structures for floor rotation and enable fast response speed.

Technical Solution

In order to achieve the above objects, an omnidirectional treadmill for virtual reality and a method for driving the same of the present invention are configured to include a footplate portion for allowing a user to step and exercise thereon like the ground; a drive unit for providing power to enable the footplate portion to rotate in opposite to a moving direction and a speed of the user; a covering and retaining portion for supporting and fixing the footplate portion and a drive unit to a specific position to operate smoothly; and a sensor portion for analyzing the moving direction and the speed of the user and transmitting a direction and a speed of operation to the drive unit.

In addition, according to the present invention, the footplate portion has a semicircular shape and is configured to include a footplate portion frame for maintaining an overall shape, a footplate for rotating while entirely surrounding the footplate portion frame, and a lubricant for allowing the footplate to smoothly rotate while being spaced apart from the footplate portion frame by a predetermined distance.

Particularly, according to the present invention, when the semicircular footplate portion frame is entirely surrounded by the footplate, it is divided into an upper part of the footplate portion frame on which the user steps like a ground surface, and a lower part that receives power. Arc lengths of the upper and lower parts are configured to be completely equal to each other, and the surface area when the footplate is deployed is configured to be equal to the surface area of a perfect sphere, so that the footplate may be deformed along the surface of the footplate portion frame without stretching or expanding.

The footplate portion is fixed by the covering and retaining portion and a plurality of ball bearing devices, and includes lower part-supporting ball bearings for supporting loads of the user and the footplate, and upper fixing ball bearings fixed to the upper part to prevent horizontal separation of the footplate portion, in which the upper fixing ball bearings are installed at an angle of 90 degrees or more to each other. In addition, since the footplate of the footplate portion is required to rotate freely in various directions, the lower supporting ball bearings and the upper fixing ball bearings rotate freely like a ballpoint pen, and firmly fix the footplate by multiple point contacts.

In addition, according to the present invention, the drive unit is positioned below the footplate, in which the drive unit serves as a stator of a linear motor and permanent magnets inserted into the footplate serve as movers, so that the footplate may obtain power to rotate the footplate on a surface of the footplate portion frame.

In addition, according to the present invention, a plurality of linear motors of the drive unit are installed orthogonally to each other in 'X' and 'Y' axes on plane coordinates, in which the outputs of the linear motors are individually controlled so that the footplate may rotate in all directions on the surface of the footplate portion frame. For example, when the user wants to move to the left, 100% of output is applied to the 'X' axis linear motors 222, so that the footplate may be allowed to rotate in the opposite direction to the direction in which the user wants to move. In addition, when the user wants to move at an angle of 45 degree to the left, the output is distributed by 50% of the output to each of the 'X' axis linear motor and the 'Y' axis linear motor, so that the footplate may be allowed to rotate in the opposite direction to the direction in which the user wants to move.

Further, according to the present invention, the lubricant is used to prevent the footplate, which rotates along the surface of the footplate portion frame, from coming into close contact with the footplate portion frame and causing friction. The lubricant may accumulate at the bottom due to the morphological characteristics of the footplate portion derived from a sphere and the gravity. In order to solve this, a magnetic fluid is used as the lubricant, in which the magnetic fluid is configured to uniformly spread between the footplate portion frame and the footplate through the magnetic force of the permanent magnets inserted into the footplate and the contraction pressure of the footplate.

Advantageous Effects

As described above, the omnidirectional treadmill for virtual reality of the present Invention can achieve the purpose of the treadmill, that is, enable in-situ exercise regardless of the user's moving speed and direction while counterbalancing a travel distance by rotating a treadmill floor in opposite directions to the user's 360-degree omnidirectional movement, so that the user can experience a wide virtual reality world even in a small space.

In addition, according to the omnidirectional treadmill for virtual reality of the present invention, the lubricant, that is, the magnetic fluid is filled to prevent friction from occurring at the joint between the hemispherical footplate portion frame and the footplate surrounding the hemispherical footplate portion frame, so that the magnetic fluid can react with the magnetism of the permanent magnets inserted into the footplate, thereby overcoming the gravity, and can be uniformly distributed on the surface of the hemispherical footplate portion frame by the shrinkage pressure of the footplate.

Further, according to a method for driving the omnidirectional treadmill for virtual reality of the present invention, the linear motors installed longitudinally and laterally serve as stators, and the permanent magnets inserted into the footplate serve as movers to generates a straight linear driving force, so that the structure can be simplified without using mechanical motion converters.

In addition, according to a method for driving the omnidirectional treadmill for virtual reality of the present invention, a plurality of linear motor stators are longitudinally and laterally installed, in which the power is freely distributed and combined to each of the linear motor stators, so that the footplate on which the user steps can rotate in all directions or operate at a specific speed.

In addition, according to a method for driving the omnidirectional treadmill for virtual reality of the present invention, the user's moving speed and direction are measured In real time through the speed/direction sensor and immediately applied to the rotation speed of the footplate, so that the user can walk or run freely without any separate operation.

Further, according to a method for driving the omnidirectional treadmill for virtual reality of the present invention, a motion capture camera is provided to measures and transmits the user's movements and motions in real time, so that the transmitted data can be immediately applied to the character of the user in virtual reality.

BEST MODE

Figure 1:
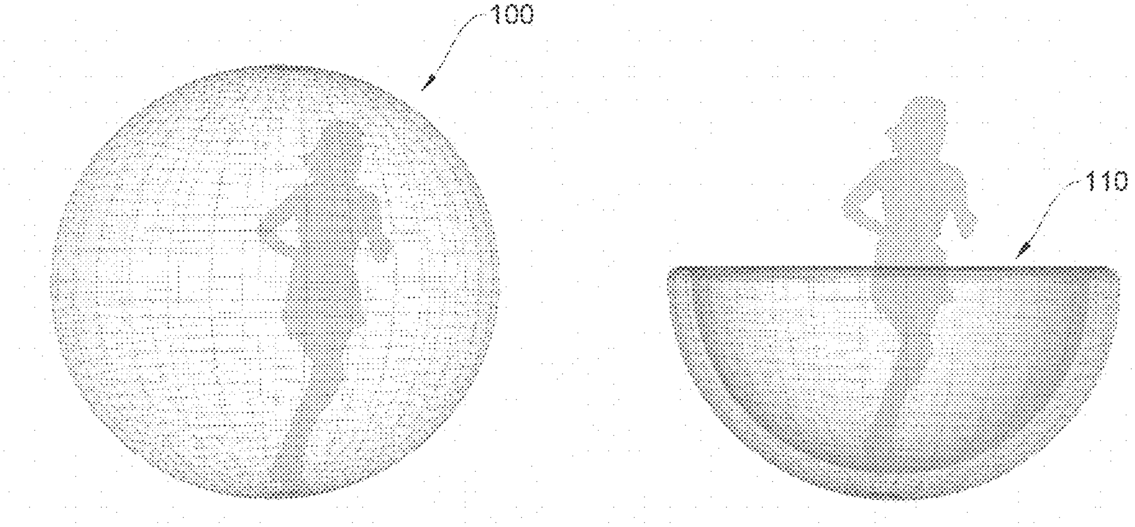
FIG. 1 shows front views of an operating principle of the present invention.
Figure 2:
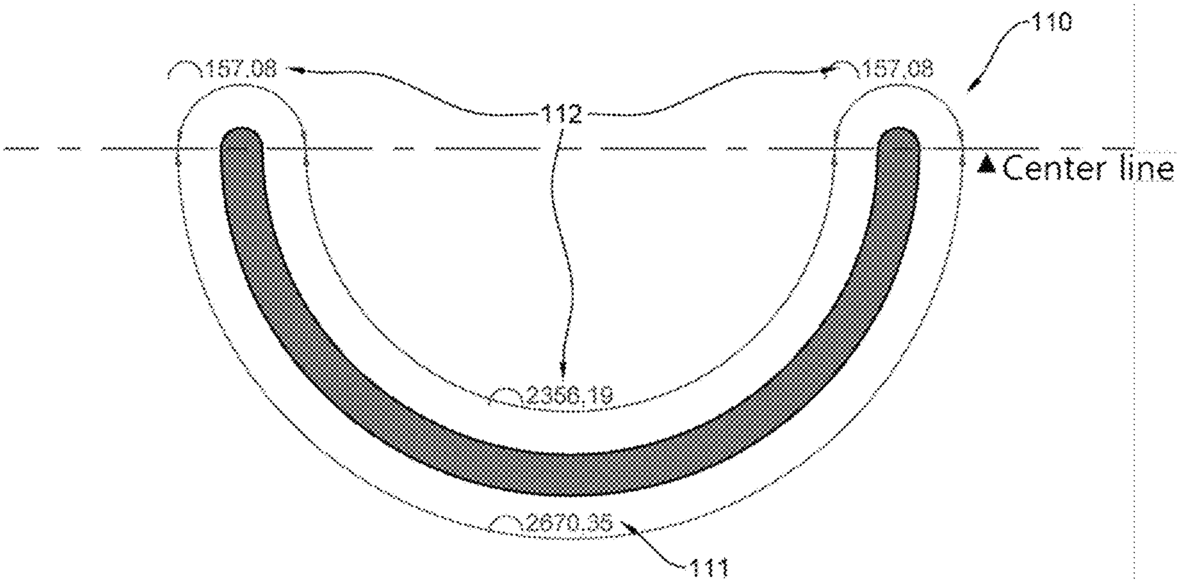
FIG. 2 is sectional view showing the feature of a spherical deformation shape of the present invention.

An omnidirectional treadmill for virtual reality and a method for driving the same of the present invention are configured to include: a footplate portion for allowing a user to step and exercise thereon like the ground; a drive unit for providing power to enable the footplate portion to rotate in opposite to a moving direction and a speed of the user; a covering and retaining portion for supporting and fixing the footplate portion and a drive unit to a specific position to operate smoothly; and a sensor portion for analyzing the moving direction and the speed of the user and transmitting a direction and a speed of operation to the drive unit.

The footplate portion has a semicircular shape and includes a footplate portion frame for maintaining an overall shape, a footplate for rotating while entirely surrounding the footplate portion frame, and a lubricant for allowing the footplate to smoothly rotate while being spaced apart from the footplate portion frame by a predetermined distance. In addition, according to the present invention, the drive unit is positioned below the footplate, in which the drive unit serves as a stator of a linear motor and permanent magnets inserted into the footplate serve as movers, so that the footplate may obtain power to rotate the footplate on a surface of the footplate portion frame.

Mode for Invention

Hereinafter, one preferred embodiment of the present invention will be described in detail with reference to the drawings attached to the present invention.

First, it will be noted that same reference numerals may indicate the same elements or components as possible in the drawings. In the following description of the embodiments of the present invention, the detailed description of relevant known functions or configurations will be omitted not to make the subject matter of the present invention unclear.

First, as shown in the example 100 of the motion inside a sphere of FIG. 1, it is assumed that a user enters the sphere and walks or runs in a specific direction. The sphere may roll freely in any direction the user wishes to move, that is, omnidirectionally. When the above principle is applied, as shown in FIG. 1 and FIGS. 2 to 5, a sphere-deformed shape 110 of the present invention is formed by deforming a sphere into folded pieces in half so as to overlap to each other, in which a length of a lower part about a center line, that is, a hemispherical arc 111 is completely equal to a length of an upper part, that is. a sum of lengths of sphere-deformed arcs 112, so that the footplate 211 is deformed without shrinkage or expansion of the surface area so as to freely rotate on the surface of a footplate portion frame 214.

Figure 3:
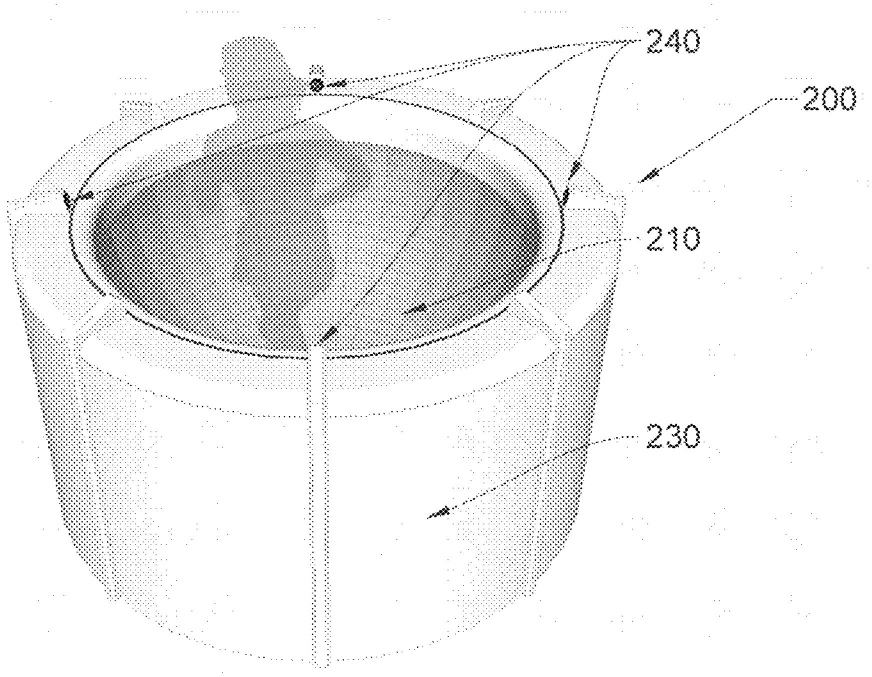
FIG. 3 is a perspective view showing an omnidirectional treadmill for virtual reality of the present invention.
Figure 4:
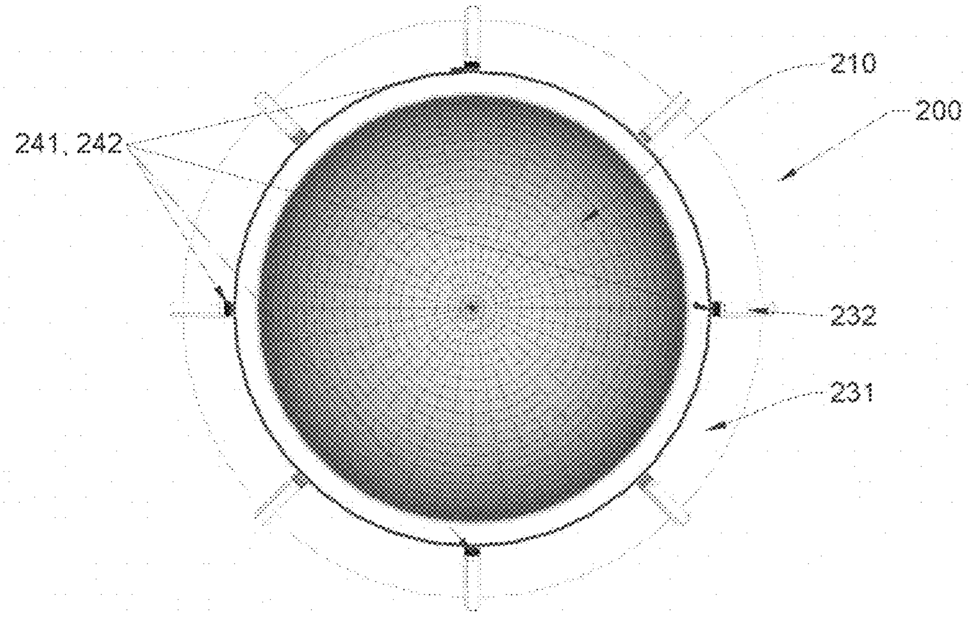
FIG. 4 is a plan view showing the omnidirectional treadmill for virtual reality of the present invention.
Figure 5:
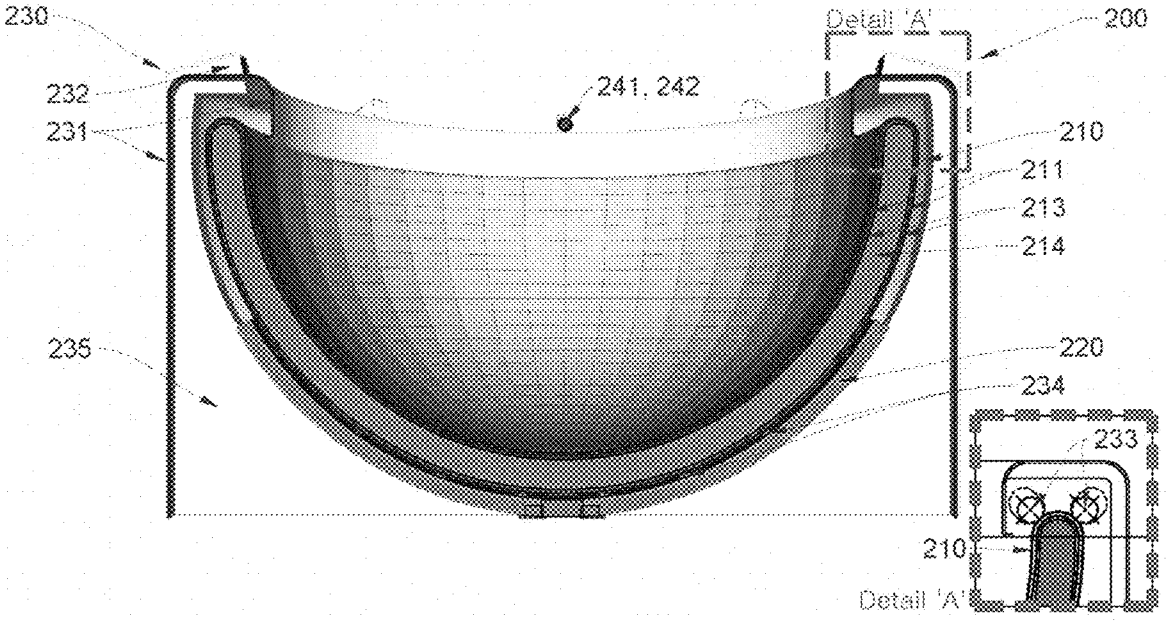
FIG. 5 is a sectional view showing the omnidirectional treadmill for virtual reality of the present invention.

In addition, as shown in FIGS. 3 and 5, the omnidirectional treadmill 200 for virtual reality of the present invention includes a footplate portion 210 for allowing a user to step and exercise thereon like a ground surface; a drive unit 220 for providing power to allow the footplate portion 210 to rotate in opposite to a moving direction and a speed of the user; a covering and retaining portion 230 for supporting and fixing the footplate portion 210 and a drive unit 220 to a specific position to operate smoothly; and a sensor and control portion 240 for analyzing the moving direction and the speed of the user to transmit a speed and a direction of operation to the drive unit 220.

The footplate portion 210 has a semicircular shape, and includes a footplate portion frame 214 for maintaining an overall shape, a footplate 211 for rotating while entirely surrounding the footplate portion frame 214, and a lubricant 213 for allowing the footplate 211 to smoothly rotate while being spaced apart from the footplate portion frame 214 by a predetermined distance.

Further, as shown in FIG. 5, the footplate portion 210 is fixed by the covering and retaining portion 230 and a plurality of ball bearing devices, and includes lower part-supporting ball bearings 234 for supporting loads of the user and the footplate, and upper fixing ball bearings 233 fixed to the upper part to prevent horizontal separation of the footplate portion, in which the upper fixing ball bearings 233 are installed at an angle of 90 degrees or more to each other. In addition, since the footplate 211 of the footplate portion 210 is required to rotate freely in various directions, the lower supporting ball bearings 234 and the upper fixing ball bearings 233 are configured to rotate freely in multiple directions like a ballpoint pen, and firmly fix the footplate 210 by multiple point contacts.

Figure 6:
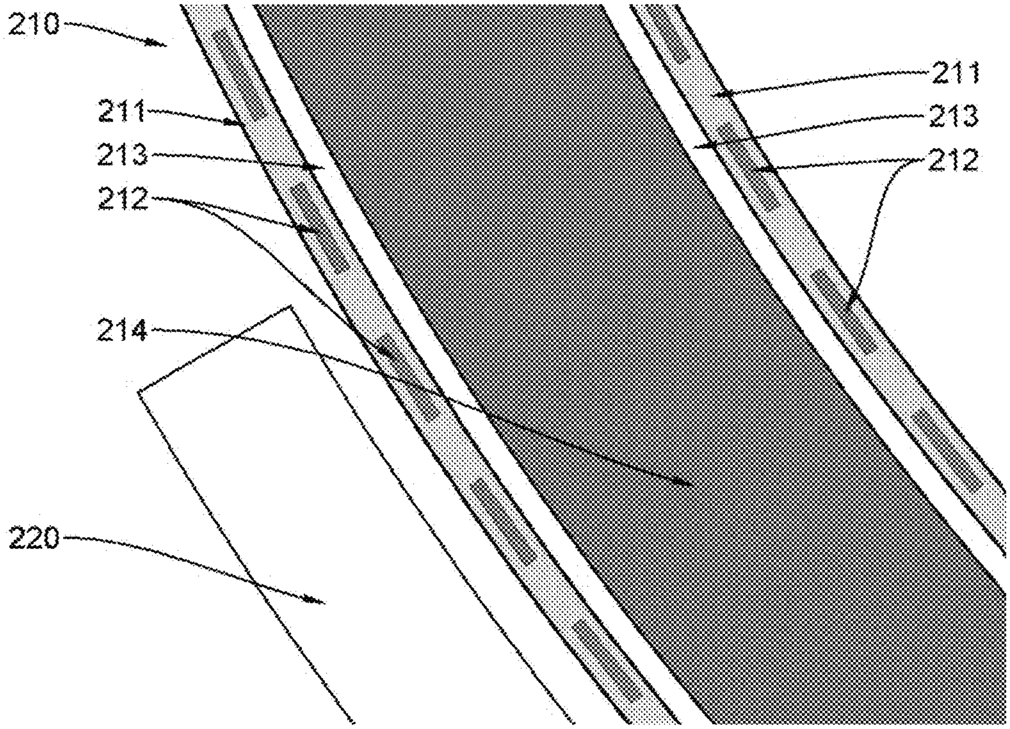
FIG. 6 is a sectional view showing a footplate portion of the omnidirectional treadmill for virtual reality of the present invention.

In addition, as shown in FIG. 6, the drive unit 220 is positioned below the footplate portion 210, such that the drive unit 220 serves as a stator of a linear motor. As shown in FIGS. 6 to 9, since permanent magnets 212 with alternately arranged N and S poles are inserted into the footplate 211 to serve as movers, the drive unit 220 and the permanent magnets 212 of the footplate 211 are electrically acted, so that power may be provided to allow the footplate 211 to rotate on the surface of the footplate portion frame 214.

Figure 7:
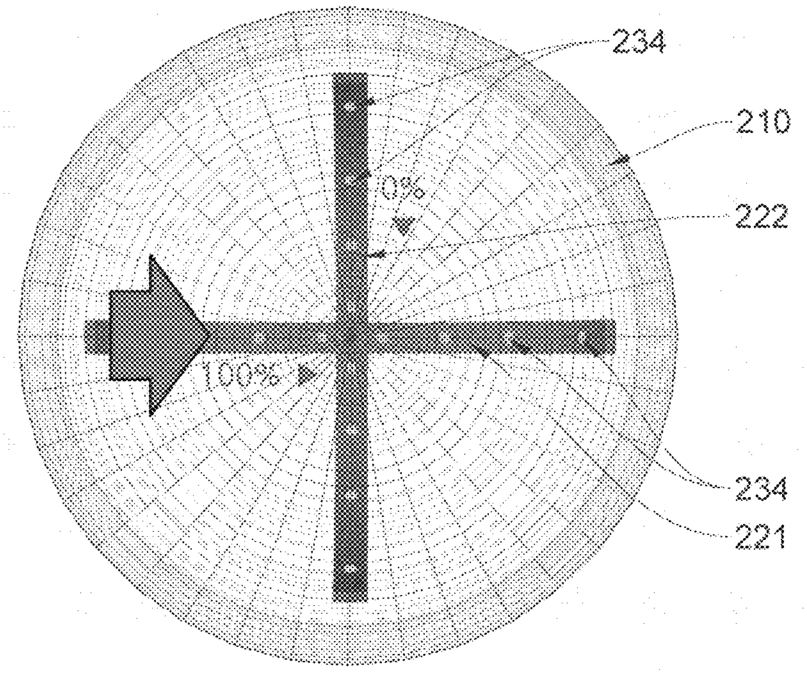
FIG. 7 is a plan view showing a driving scheme of the omnidirectional treadmill for virtual reality of the present invention.
Figure 8:
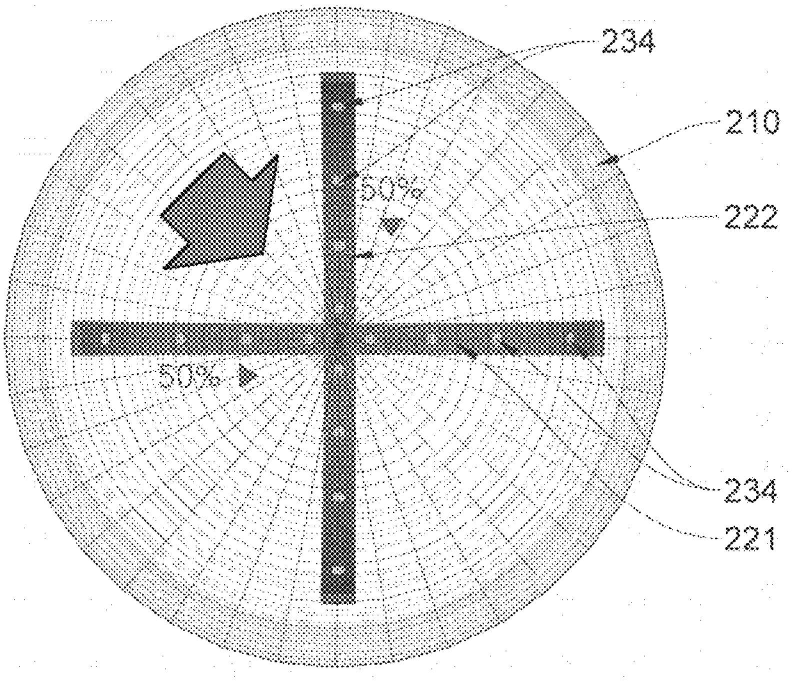
FIG. 8 is a plan view showing a driving scheme of the omnidirectional treadmill for virtual reality of the present invention.
Figure 9:
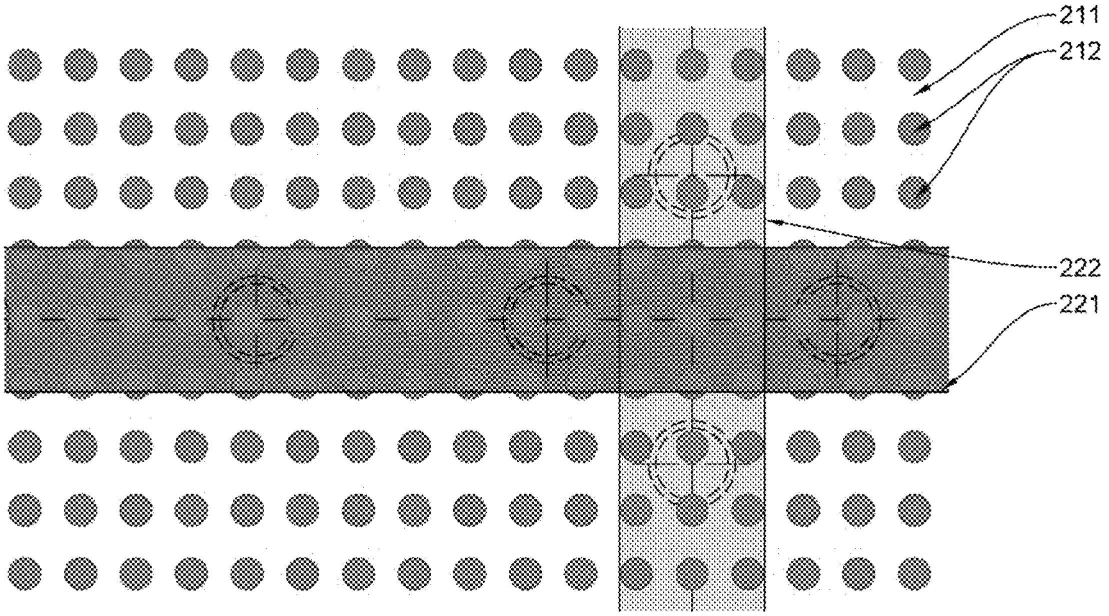
FIG. 9 is an enlarged view showing the arrangement of permanent magnets inserted into a drive portion and a footplate of the footplate portion of the omnidirectional treadmill for virtual reality of the present invention.

Particularly, as shown in FIGS. 7 and 8, a plurality of linear motors of the drive unit 220 are installed orthogonally to each other in 'X' 222 and 'Y' 221 axes on plane coordinates, in which outputs of the linear motors is respectively controlled or combined to allow the footplate 211 to rotate on the surface of the footplate portion frame 214 in all directions. For example, when the user wants to move to the left, 100% of output is applied to the 'X' axis linear motors 222, so that the footplate 211 may be allowed to rotate in the opposite direction to the direction in which the user wants to move. In addition, when the user wants to move at an angle of 45 degree to the left, the output is distributed by 50% of the output to each of the 'X' 222 axis linear motor and the 'Y' axis 221 linear motor and combined, so that the footplate 211 may be allowed to rotate in the opposite direction to the direction in which the user moves. The lubricant 213 is used to prevent the footplate 211, which rotates along the surface of the footplate portion frame 214, from coming into close contact with the footplate portion frame and causing friction. Since the lubricant 213 may accumulate at the bottom due to the morphological characteristics of the footplate portion 210 and gravity, to solve this, a magnetic fluid 213 is used as the lubricant 213, in which the magnetic fluid 213 may be distributed with a uniform thickness between the footplate portion frame 214 and the footplate 211 by using the magnetic force of the permanent magnets 212 inserted into the footplate 211.

The operation of the present invention configured in the above manner will be described as follows.

First, the sensor and control portion 240 detects the user's movement direction and speed, analyzes data, and supplies power to the 'X' axis linear motor 222 and the 'Y' axis linear motor 221 of the drive unit 220.

The amount of power supplied to the 'X' axis linear motor 222 and the 'Y' axis linear motor 221 may be selectively distributed according to the movement direction and speed.

When the power is supplied to the 'X' axis linear motor 222 and the 'Y' axis linear motor 221 of the drive unit 220 as described above, the permanent magnets 212 inserted into the footplate 211 surrounding the surface of the footplate portion frame 214 interacts electrically, thereby generating the straight-line driving force.

In addition, since the footplate portion frame 214 is spaced apart from the footplate 211 at a predetermined distance due to the lubricant 213, thereby reducing a surface friction of a joint part, so that the footplate 211 may be allowed to rotate freely on the surface of the footplate portion frame 214.

Since the footplate portion frame 214 has a shape deformed from a complete sphere, and the linear driving force in the two directions of the 'X' axis and the 'Y' axis is transmitted in combination from the drive unit 220, the user's movements are counterbalanced in response to all directions and speeds.

Thus, the omnidirectional treadmill for virtual reality and the method for driving the same of the present invention can achieve the purpose of the treadmill, that is, allow the user to walk or run while remaining at the original point in response to all movements and speeds of the user, so that the user can be allowed to explore the vast virtual reality world even in a narrow real space.

DESCRIPTION OF DRAWINGS

| | |
|---|---|
| 100: Example of motion inside sphere | |
| 110: Sphere-deformed shape of the present invention | |
| 111: Length of hemispherical arc | 112: Length of sphere-deformed arc |
| 200: Omnidirectional treadmill for virtual reality | |
| 210: Footplate portion | 211: Footplate |
| 212: Permanent magnet (mover) | 213: Lubricant (magnetic fluid), |
| 214: Footplate portion frame | 220: Drive portion |
| 221: 'Y' axis linear motor (stator) | 222: 'X' axis linear motor (stator) |
| 230: Covering and retaining portion | 231: Outer cover |
| 232: Sensor cover | 233: Upper fixing ball bearing |
| 234: Lower supporting ball bearing | 235: Structure member |
| 240: Sensor and control portion | 241: Speed/direction sensor |
| 242: Motion capture camera | |

INDUSTRIAL APPLICABILITY

The omnidirectional treadmill for virtual reality and the method for driving the same of the present invention may be installed in home, commercial VR experience centers, health clubs or the like, and used in any virtual reality game, tourism or the like to which virtual reality can be applied.

The invention claimed is:

1. An omnidirectional treadmill for virtual reality and a method for driving the same, the omnidirectional treadmill comprising:

a footplate having a hemispherical shape with a surface area exactly identical to a surface area of a sphere to allow a surface material of the footplate to rotate in all directions without contracting and stretching;

a footplate portion frame installed inside the footplate to maintain the hemispherical shape; the footplate configured to rotate relative to the footplate portion frame; and a covering and retaining portion for fixing a footplate portion formed by combining the footplate with the footplate portion frame to a predetermined position to ensure smooth operation.

2. The omnidirectional treadmill of claim 1, further comprising:

permanent magnets inserted into the footplate to have N and S poles alternating each other; and a drive unit for operating an electromagnetic force to the permanent magnets to provide a straight linear driving force, wherein the drive unit serves as a stator of a linear motor, and is provided in two or more directions to distribute and combine outputs, so that the footplate rotate in a predetermined direction.

3. The omnidirectional treadmill of claim 1, further comprising a sensor and a control unit configured such that a drive unit detects movements of a user in real time and controls a rotation direction and a speed of the footplate.

4. The omnidirectional treadmill of claim 1, further comprising a motion capture camera configured such that motions of a user is applied to the virtual reality.

5. The omnidirectional treadmill of claim 1, wherein a lubricant is filled at a joint surface between the footplate portion frame and the footplate to reduce friction.

6. The omnidirectional treadmill of claim 1, wherein the footplate portion frame has the hemispherical shape, a magnetic fluid is used to prevent the filled lubricant from clumping at a bottom of the footplate portion frame due to gravity, and uniformly distributed on the hemispherical footplate portion by magnetic forces of permanent magnets inserted into the footplate.

* * * * *